United States Patent [19]

Weston

[11] 3,952,678

[45] Apr. 27, 1976

[54] POWER BOAT

[76] Inventor: Paul H. Weston, 16422 NE. 29, Bellevue, Wash. 98008

[22] Filed: Jan. 27, 1975

[21] Appl. No.: 544,414

[52] U.S. Cl. .............................. 114/66.5 S
[51] Int. Cl.² ................................ B63B 1/18
[58] Field of Search ............... 114/66.5 R, 66.5 F, 114/66.5 H, 66.5 P, 66.5 S, 67 R, 67 A, 61; 9/6; 115/70; D12/10, 11, 62

[56] References Cited
UNITED STATES PATENTS

| 1,396,831 | 11/1921 | Gardner | 114/66.5 S |
| 1,842,858 | 1/1932 | Couzinet | 114/66.5 S |
| 3,112,725 | 12/1963 | Malrose | 114/66.5 R |
| 3,118,411 | 1/1964 | Koriagin | 114/66.5 R |
| 3,394,673 | 7/1968 | Hamori | 115/70 |
| 3,785,330 | 1/1974 | Fox | 115/70 |
| D117,415 | 10/1939 | Gassaway | 114/66.5 S |
| D215,370 | 9/1969 | Calkins | D12/62 |

FOREIGN PATENTS OR APPLICATIONS

| 282,440 | 2/1931 | Italy | 114/66.5 S |

Primary Examiner—Trygve M. Blix
Assistant Examiner—Jesus D. Sotelo

[57] ABSTRACT

A central, longitudinally extending, main body boat portion has a step planing surface located forward of the boat's center of gravity. Parallel side sponsons are connected by a wing structure to the main body with the sponsons parallel to the main body portion. Each sponson has forward and rearward stepped planing surfaces disposed, respectively, forwardly and rearwardly of the boat's center of gravity. The propeller and powerplant therefor are disposed in the main body portion and positioned relative to the stepped portions to cause the propeller to operate two-thirds in water at higher speeds. Fins at the under and rear sides of the boat cooperate with a rudder disposed at the forward main underside portion in steering the boat. One of such fins is disposed close to the wash leaving the propeller to counterbalance the torque of the propeller. Each wing structure, connecting the main body and the sponson, is tapered to a sharp, leading edge and to a thin trailing edge with the leading edge disposed approximately twice as far from the water as the trailing edge at higher boat speeds. During higher speeds, the sponsons prevent relatively passing air from escaping sidewise and air is compressed under the wing structure producing a lift which carries most of the weight of the boat. This lift decreases if the boat rises from the water, due to the water surface conditions, and thus balance conditions prevail during boat travel.

3 Claims, 6 Drawing Figures

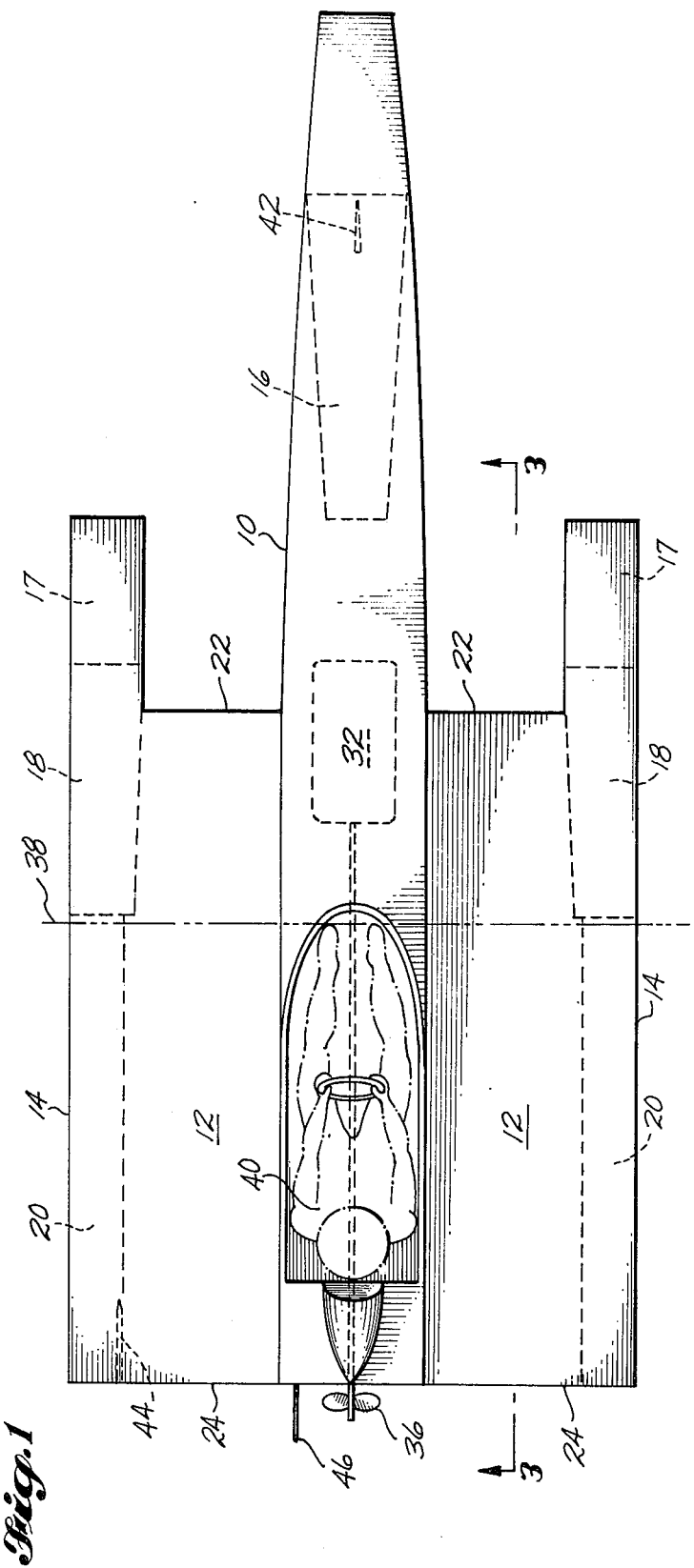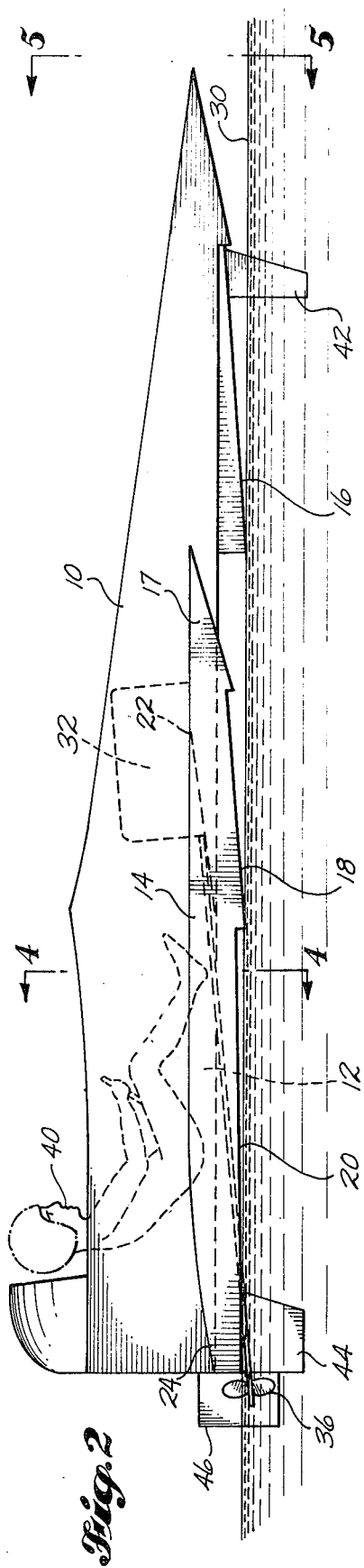

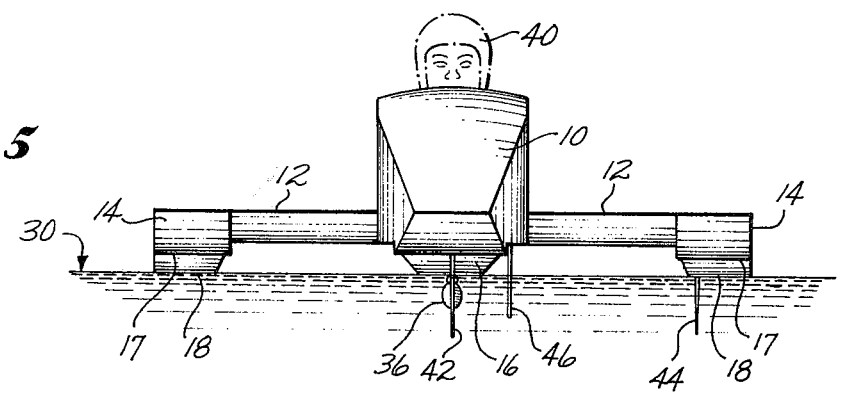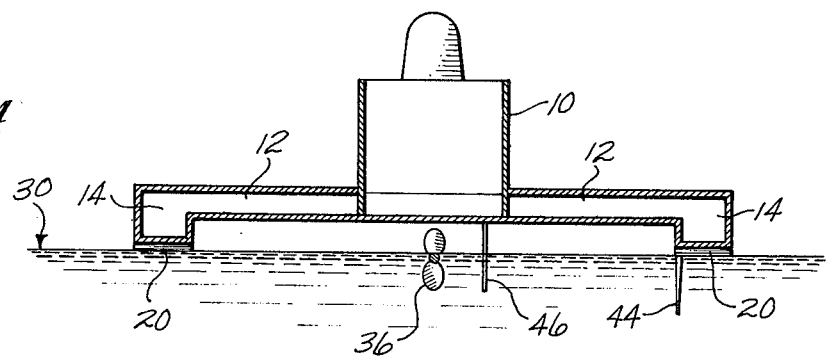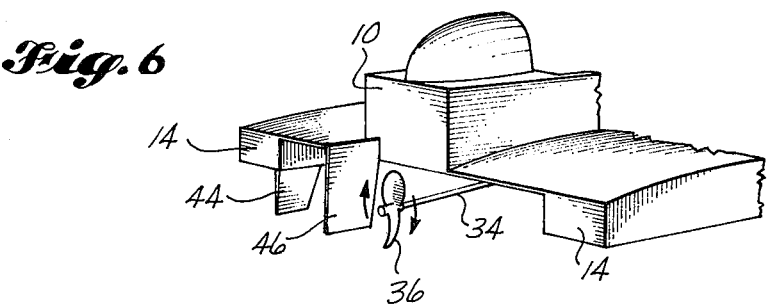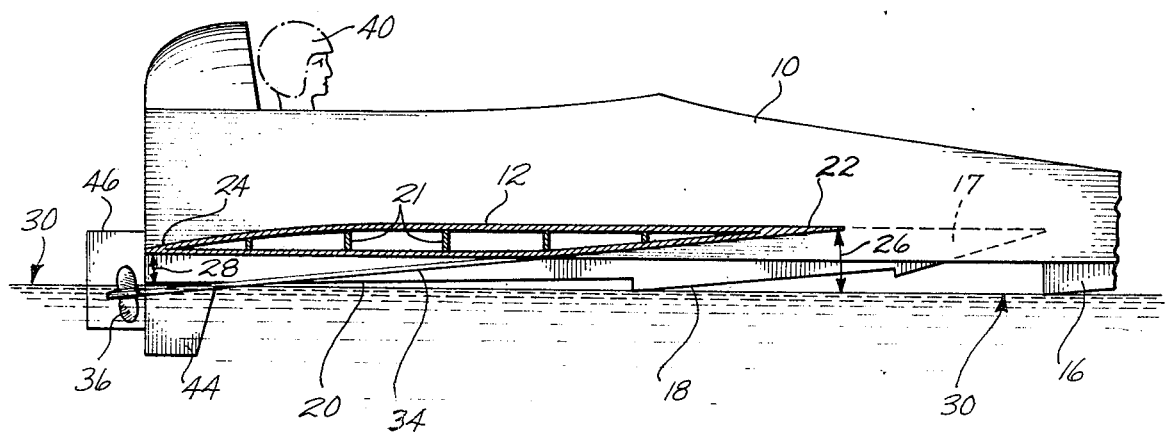

POWER BOAT

BACKGROUND OF THE INVENTION

The present invention relates in general to that type of speedboat which is commonly termed a hydroplane and of the limited or unlimited class. The currently most successful types of such boats are generally referred to as three-point suspension boats, indicating that, at higher speeds, the boat is supported on the water at the propeller and at the trailing ends of the two side sponsons. With boats of such attitudes to the water, most of the underside of the boat is exposed to and is being contacted by relatively passing air. In bad weather, such as when the wind is substantial and is gusty and the water surface is rough, the action of the relatively passing air on the large, exposed underside of such a boat is such as to provide for a very unstable boat. The stability of such a boat is often reduced to a minimum and requires the slackening of speed to a point below that considered acceptable under racing conditions. Also, when such boats are operated in rough weather, they often jump or leap from one wave crest to the next. This causes the load on the driven propeller and connected power plant to move from maximum to minimum and vice versa and thus provides maximum strains on such equipment.

As hereinafter discussed in greater detail, I provide a boat which is supported on a water surface on five stepped planing surfaces. A main body portion has a stepped planing surface on its underside and which surface is located well forward of the center of gravity of the boat and provides a supporting surface for the front end portion of the boat. Two side sponsons are connected by a wing structure with the main body portion. These side sponsons are disposed parallel to each other and parallel to the main body portion. Each side sponson has on its underside, two stepped planing surfaces, a forward one located forward of the center of gravity of the boat and a rearward one located rearwardly thereof and extending to the rear of the boat. Thus, the boat has five stepped planing surfaces on which it may be supported on a water surface. The wing structure interconnecting the side sponsons and the main body portion tapers to a sharp, leading, forward edge and also tapers to a thin, trailing edge. During higher speeds of the boat, the said forward edge is about twice as far from the water surface as the said trailing edge; the boat is supported on said five stepped planing surfaces; the propeller is turning with about two-thirds thereof below the water surface; and the boat is supported by the relatively passing air below the wing structure. The side sponsons prevent such relatively moving air from escaping sidewise and thus, the said air is compressed beneath the wing structure. This compressed air provides the lifting force supporting most of the weight of the boat and its contents. If rough water should lift the boat from the water surface, the effective force of the compressed air will be lessened and the boat will again rest on the water and resume a proper and stable attitude. As the construction provides for an attitude of the boat in the water with the bow on the water, a steering rudder is provided at the bow rather than at the stern of the boat. In order that the stern shall follow the bow portion during turns rather than slipping sidewise, fins having a substantial surface disposed longitudinally of the boat and vertically are provided. Also, a fin is disposed close to the wash side of the propeller to counterbalance the torque or the tendency of the aft end of the boat to move sidewise in a given direction in response to the rotation of the propeller in a given direction.

SUMMARY OF THE INVENTION

The invention comprises a main body portion and two side sponsons, parallel to each other and to the main body portion, and interconnected by a wing structure. The main body portion has a stepped planing surface on its underside and located forward of the center of gravity of the boat. Each of the side sponsons has two stepped planing surfaces on the underside of each thereof, one forward of the center of gravity of the boat and one rearward of such center. The wing structure is located mostly rearwardly of the center of gravity of the boat and forwardly tapers to a sharp, leading edge and rearwardly tapers to a thin, trailing edge. At higher speeds of the boat, the leading edge of the wing structure is approximately twice as far from the water surface as the trailing edge. The relatively passing air is trapped between the bottom of the wing structure and the water surface (top and bottom) and between the side sponsons (sidewise) and is compressed. This compressed air provides the lifting force to carry most of the weight of the boat. This structure provides a boat with good stability and proper attitudes as the boat soon reaches a balance between this lifting force and the reaction of the boat to inclement weather and water conditions.

When the boat is traveling at higher speeds, the boat is supported on the water surface with the five stepped surfaces in supporting relation thereon; the propeller is turning with about two-thirds thereof below the water surface, the steering rudder is in the water; the fin means are in the water; and most of the weight of the boat is supported by compressed air between the side sponsons, the wing area, and the water surface. At the rear end of the boat, longitudinally extending fins provide vertical surfaces preventing side slipping of the rear end portion of the boat and to counterbalance the torque of the turning propeller to move the rear end portion of the boat sidewise.

The foregoing and other teachings and advantages of this invention will become explicit and implicit from the following detailed description of the invention in connection with the accompanying drawings, wherein like reference numerals refer to like parts.

BRIEF DESCRIPTION OF THE DRAWINGS

FIG. 1 is a plan view;

FIG. 2 is a side elevational view;

FIG. 3 is a view partially in section and partially in elevation taken substantially on broken line 3—3 of FIG. 1;

FIG. 4 is a sectional view with parts in elevation, taken substantially on broken line 4—4 of FIG. 2, and with the phantom figure not shown;

FIG. 5 is a front elevation and taken substantially on broken line 5—5 of FIG. 2; and FIG. 6 is a perspective fragmentary view of the aft or rear end portion of the boat.

DETAILED DESCRIPTION OF THE DRAWINGS

The main body portion 10 extends longitudinally of the boat and is fabricated in a conventional manner so that this body and parts connected therewith will withstand the forces expected thereagainst. A wing structure 12 is fabricated to withstand similar forces and connects the main body portion to a side sponson 14 on each side thereof. The side sponsons 14, wing structure 12, and main body portion 10 are fabricated, by conventional methods, to produce extreme rigidity and strength and with a minimum weight and mass.

The main body portion 10 has a stepped planing surface 16 located on its underside and positioned forward of a crossline 38 indicating the center of gravity of the boat. Stepped planing surfaces 17 are preferably disposed on the underside of each side sponson 14 for the purpose of aiding the forward end portions of the side sponsons 14 in elevating to above the water during initial increase of speed. During normal operation at higher speeds, the stepped planing surfaces 17 are above the water surface 30 and thus do not affect the mode of operation of the boat at such speeds. Each of the side sponsons 14 has a forward stepped planing surface 18 located on its underside and positioned forward of such center of gravity of the boat and also has a rearward stepped planing surface 20 located on its underside and positioned rearward of such center of gravity of the boat.

The wing structure 12 has appropriate internal bracing 21 to provide appropriate strength to carry the side sponsons 14 by the main body portion 10 and to provide for a relatively thin wing structure 12 with a sharp, leading edge portion 22 and a rearwardly tapered, thin, trailing edge portion 24. As indicated by arrowed line 26, as compared to arrow line 28, the leading edge portion 22 of the wing structure 12 is approximately twice as far from the water surface 30 as the trailing edge portion 24 of the wing structure 12. This showing is representative of the relative distances involved when the boat is traveling at higher speeds.

An engine 32, drive shaft 34, and propeller 36 are diagrammatically illustrated and are positioned in the main body portion 12 of the boat so that the boat, when traveling at higher speeds, has a center of gravity represented by the indicia crossline 38 of FIG. 1.

The boat is controlled by a driver (illustrated by the phantom FIG. 40) operating steering control means and various levers (not shown) to operate the boat, which includes means for operating the movable rudder means 42 positioned at the prow or forward end of the boat. Due to the position of the center of gravity of the boat when moving at higher speeds, the boat is supported on the water surface, with one stepped planing surface 16 (on the underside of the main body portion 10), two forward stepped planing surfaces 18 (on the underside of side sponsons 14), two rearward stepped planing surfaces 20 (on the underside of side sponsons 14), and the rudder means 42 in water and below the water surface level 30. Obviously, parts which are below the water level at higher speeds will also be below the water level at lower speeds but the opposite is not necessarily true. Fin means 44 present a longitudinal, vertical surface disposed at the aft end portion of the boat. In FIGS. 1 and 2, the fin means 44 is connected with the aft end portion of the left sponson 14, however, if desired, such fin means may be carried by the right sponson or may be carried by both sponsons. What is desired is to provide a vertical surface disposed longitudinally of the boat and at the aft end portion thereof so that the aft end portion of the boat does not tend to skid or slip sideways as the front end portion of the boat is turning the desired direction in response to manipulation of the rudder means 42.

When the rudder means 42 is angularly positioned to the longitudinal center line of the boat, the front end of the boat will turn toward a direction indicated by such position of the rudder menas 42. At the same time, the aft end portion of the boat will follow or trail and will not side slip or skid sideways because of the action of the fin means 44.

A turning propeller on a boat always causes a torque or side thrust tending to move the aft end portion of a boat in a given direction corresponding to the turning direction of the propeller and its consequent wash. This tendency is extremely pronounced in power driven racing boats due to the pitch and high revolution speed of the propellers, and is also pronounced when a portion of a propeller is operating out of the water. Thus, preferably, an additional fin means 46 (see FIG. 6) is disposed in relatively close proximity to the propeller 36 and to the wash side or the side to which the propeller 36 urges water. Thus, if a propeller turns clockwise (as viewed in FIG. 6), the propeller will urge its wash not only rearwardly but to the left as viewed in said figure. Thus, the additional fin 46 is illustrated as being positioned to the left of the propeller 36 in said FIG. 6 of the drawings. The propeller will urge its side wash to the left against said fin 46 and the said fin means 46 will urge the said wash in the opposite direction and a balance is obtained and the undesirable torque is eliminated or counterbalanced.

BRIEF SUMMARY

From the foregoing, it will now be apparent that I have provided a boat having a main body portion 10 having a stepped planing surface 16 on its underside and which stepped surface 16 is disposed forward of the center of gravity of the power boat, the said center being indicated by dot-and-dash crossline 38. Two side sponsons 14 are disposed parallel to each other and parallel to and connected with the main body portion 10. Each of the side sponsons has a forward stepped planing surface 18 on its underside and each of which is disposed forward of the center of gravity of the power boat and each of the side sponsons 14 has a rear stepped planing surface on its underside and the later stepped planning surfaces are disposed rearward of the center of gravity of the power boat. This provides for five stepped planing surfaces on which the power boat may be supported while traveling on water. The power plant 32, drive shaft 34, and propeller 36 provide for travel of the boat and are disposed so that the center of gravity of the boat is substantially along dot-and-dash crossline 38. The steering rudder means 42 is disposed on the forward end bottom portion of the main body 10 of the boat.

The propeller means 36 is positioned approximately in line with the rear end portion of the rear planing surfaces 20 of the side sponsons 14 and at high speeds is restrained from full submersion by said planing surfaces and at such speeds the forward end portion of the boat is supported by contact of the stepped planing surface 16 with the water. Also, the stepped planing surface 16 is forward of the center of gravity of the boat and this prevents, substantially, any tendency of the boat to rock forward and change the extent of submergence of the propeller 36.

The power plant 32, drive shaft 34, and propeller 36 are disposed in the power boat so that the center of gravity of the power boat, when traveling at higher speeds, is close to the rear end of the forward stepped planing surfaces 18. In other words, the crossline 38 representing the center of gravity is in close proximity to the trailing end portions of the forward stepped planing surfaces 18 as appears in FIG. 1 of the drawings.

Due to the positioning of the various parts and the operation thereof, the circular path of operation of the propeller 36 is such that a part of the propeller is below the surface of the water and part is above the ate surface during the driving of this boat. This allows the propeller to be shaped and located and operated for the greatest forward thrust since the operation of the propeller does not affect the attitude of the boat as it does in prior boats where the propeller and center of gravity of the boat were operating such that the propeller was one of the three points of suspension of the boat.

The longitudinally extending fin 46 is provided at the rear of the boat and in close proximity to the propeller 36 so that the wash from the propeller is urged against the fin 46 and such water is caused to flow in the opposite direction after reacting on said fin 46 and hence, the torque caused by the turning propeller is neutralized.

Further, I have provided the winglike structure 12 which connects the side sponsons 14 to the main body portion 10 and this wing structure or supporting member 12 is disposed with its greatest portion rearward of the center of gravity of the boat or rearward of the dot-and-dash line 38 of FIG. 1. The structure 12 is provided with a thin, leading edge surface 22 and a thin, trailing edge surface 24 and the leading edge surface 22 is at a higher elevation than the trailing edge surface 24 and the leading edge surface portion 22 is above the level of water supporting the power boat permitting the relatively traveling air to move under the supporting surface 12 and to be compressed and such compressed air provides for a substantial support of the boat and, in fact, for the support of the greater portion of the weight thereof. This provides for substantial stability of the boat when traveling on water.

The fin means 44 is positioned at the rear end underside portion of the boat and such fin 44 reacts against any tendency of the boat to skid or slide sideways in response to turning of the boat because of rudder means 42 positioned at the bottom forward end portion of the boat.

Obviously, changes may be made in the forms, dimensions, and arrangements of the parts of my invention without departing from the principle thereof, the above setting forth only preferred forms of embodiment.

I claim:

1. A power boat comprising a central, longitudinally extending, main body portion extending substantially the full length of the boat, having a rear end portion engaging the water when the boat is traveling on water, and having a stepped planing surface on its underside, which stepped surface is disposed forward of the center of gravity of the power boat; two side sponsons disposed parallel to each other, parallel to, and connected with, said main body portion and extending from substantially the stepped surface on the main body portion to the rear end portion of the boat, each side sponson having a forward stepped planing surface on its underside and disposed forward of the center of gravity of the power boat, and each having a rear stepped planing surface on its underside and disposed rearward of the center of gravity of the power boat, thereby providing five stepped planing surfaces on which the power boat may be supported while traveling on water; a power plant, propeller drive shaft, and propeller disposed in the main body section of the power boat, providing for travel thereof, said propeller being located in close proximity to a transverse line coinciding with the rear end portions of the rear stepped planing surfaces on the side sponsons and having a circular path of operation, part of which is below the surface of the water supporting the boat and part of which is above such water surface; and a steering rudder disposed on the forward end bottom portion of the main body portion of the power boat, extending downwardly therefrom, and engaging the water when the boat is traveling on water.

2. The combination of claim 1, wherein a longitudinally extending fin is disposed alongside of, and in close proximity to, the propeller and to the side thereof where water is urged by the propeller and a vertical, longitudinally directed fin disposed on the rear, bottom end portion of the boat reacting against the tendency of the boat to skid or slide sidewise as the front end portion of the boat is turned a given direction in response to the steering of the boat by the rudder disposed at the bottom forward end portion of the boat.

3. The combination of claim 1, wherein the side sponsons are connected to the main body portion by a supporting member which is disposed with its greater portion rearward of the center of gravity of the power boat, and which supporting member is tapered to a thin, leading edge surface and a thin, trailing edge surface and the leading edge surface is at a higher elevation than the trailing edge surface and is above the water level of the water supporting the power boat when the same is on water, permitting air under the supporting surface and between the side sponsons to be compressed, when the power boat is traveling at higher speeds, and such compressed air provides substantial support for the boat.

* * * * *